United States Patent
Bhogal et al.

(10) Patent No.: US 8,719,181 B2
(45) Date of Patent: May 6, 2014

(54) MANAGING SHIPMENTS IN AN ORDER BY PROXY SERVICE

(75) Inventors: Kulvir Singh Bhogal, Fort Worth, TX (US); Lev Mirlas, Thornhill (CA); Robert Ross Peterson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1622 days.

(21) Appl. No.: 11/972,382

(22) Filed: Jan. 10, 2008

(65) Prior Publication Data

US 2009/0182613 A1    Jul. 16, 2009

(51) Int. Cl.
   *G06Q 30/00*    (2012.01)
   *G06Q 10/00*    (2012.01)

(52) U.S. Cl.
   USPC .......................................... 705/330; 705/1.1

(58) Field of Classification Search
   USPC .................... 705/1.1, 330–342, 400
   See application file for complete search history.

(56) References Cited

U.S. PATENT DOCUMENTS

| | | | |
|---|---|---|---|
| 7,257,552 B1 | 8/2007 | Franco | |
| 7,774,234 B1 * | 8/2010 | Kopelman et al. | 705/26.1 |
| 2002/0038266 A1 | 3/2002 | Tuttrup et al. | |
| 2002/0107820 A1 | 8/2002 | Huxter | |
| 2002/0165729 A1 * | 11/2002 | Kuebert et al. | 705/1 |
| 2004/0153379 A1 | 8/2004 | Joyce et al. | |
| 2005/0149373 A1 * | 7/2005 | Amling et al. | 705/8 |
| 2006/0111986 A1 * | 5/2006 | Yorke et al. | 705/26 |

OTHER PUBLICATIONS

"Welcome to Amazon Web Services," Amazon Web Services, retrieved Oct. 23, 2007, pp. 1-3, http://www.amazon.com/gp/browsw.html?node=3435361.
"Screen Scraping," Wikipedia, retrieved Oct. 23, 2007, pp. 1-4, http://en.wikipedia.org/wiki/Screen_scraping.

* cited by examiner

*Primary Examiner* — George Chen
(74) *Attorney, Agent, or Firm* — Yee & Associates, P.C.

(57) ABSTRACT

Illustrated embodiments provide a computer implemented method, an apparatus and a computer program product in an order by proxy service for managing shipments. In one illustrative embodiment, the computer implemented method identifying a set of initial orders received at the proxy service and responsive to identifying the set of initial orders at the proxy service, identifying a set of delivery preferences associated with each order in the set of initial orders to form a set of identified delivery preferences. The computer implemented method further aggregates the set of initial orders based on the set of identified delivery preferences to produce an aggregated order, and releasing the aggregated order for shipping based on predetermined criteria to create a released order.

20 Claims, 3 Drawing Sheets

MANAGING SHIPMENTS IN AN ORDER BY PROXY SERVICE

BACKGROUND OF THE INVENTION

1. Field of the Invention

The present invention relates generally to an improved data processing system, and in particular to a computer implemented method, an apparatus and a computer program product for managing shipments in an order by proxy service.

2. Description of the Related Art

Conventional shopping involves, actions, such as, selecting an item, making a purchase and either taking the goods or arranging for the delivery of the goods. In the world of online shopping, the challenge lies in delivering the goods to the customer at a reasonable cost, as the opportunity for a customer to take the goods at the time of purchase often does not exist.

Current solutions attempt to address the delivery issue from the viewpoint of fulfillment after the orders have been processed. Differing solutions are present in the form of collection points for shipped items and delivering individual items to individual customers. Individual delivery has proven to be inefficient and troublesome due to the costs and timing of delivery. In many cases, the individual delivery solution while relatively expensive may fail to deliver the goods because the recipient was not at home at the time of delivery. In the event the recipient misses the initial delivery; the recipient typically has to travel to a distribution center of the delivery enterprise to pick up the item or wait for another attempted delivery of the item. This situation adds to both the cost and frustration in delivering items to purchasers.

Other solutions provide bulk shipments to collection points. Individual orders may also be handled within the bulk shipment such that the customer is still able to track and review the order and delivery status. With these solutions, again, the focus is on the fulfillment of orders as viewed from the shipping perspective.

Therefore, it would be advantageous to have a method, apparatus, and computer program product for processing orders for items in a manner that overcomes some or all of the problems discussed above.

SUMMARY OF THE INVENTION

Illustrative embodiments provide a computer implemented method, an apparatus, and a computer program product in an order by proxy service for managing shipments. In one illustrative embodiment, the computer implemented method identifies a set of initial orders received at the proxy service and responsive to identifying the set of initial orders at the proxy service, identifies a set of delivery preferences associated with each order in the set of initial orders to form a set of identified delivery preferences. The computer implemented method further aggregates the set of initial orders based on the set of identified delivery preferences to produce an aggregated order, and releases the aggregated order for shipping based on predetermined criteria to create a released order.

In another illustrative embodiment, the apparatus, in the form of a data processing system comprises a bus, a memory connected to the bus, a persistent storage connected to the bus, wherein the persistent storage comprising computer executable instructions, a communications unit connected to the bus, a display connected to the bus, and a processor connected to the bus. The processor executes the computer executable instructions on the data processing system to identify a set of initial orders received at the proxy service and responsive to identifying the set of initial orders at the proxy service, identify a set of delivery preferences associated with each order in the set of initial orders to form a set of identified delivery preferences. The processor further executes the computer executable instructions on the data processing system to aggregate the set of initial orders based on the set of identified delivery preferences to produce an aggregated order, and release the aggregated order for shipping based on predetermined criteria to create a released order.

In another illustrative embodiment, the computer program product comprises a computer usable recordable medium tangibly embodying computer executable program code thereon, the computer executable program code comprises computer executable program code for identifying a set of initial orders received at the proxy service and computer executable program code responsive to identifying the set of initial orders at the proxy service, for identifying a set of delivery preferences associated with each order in the set of initial orders to form a set of identified delivery preferences. The computer program product further having computer executable program code for aggregating the set of initial orders based on the set of identified delivery preferences to produce an aggregated order, and computer executable program code for releasing the aggregated order for shipping based on predetermined criteria to create a released order.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
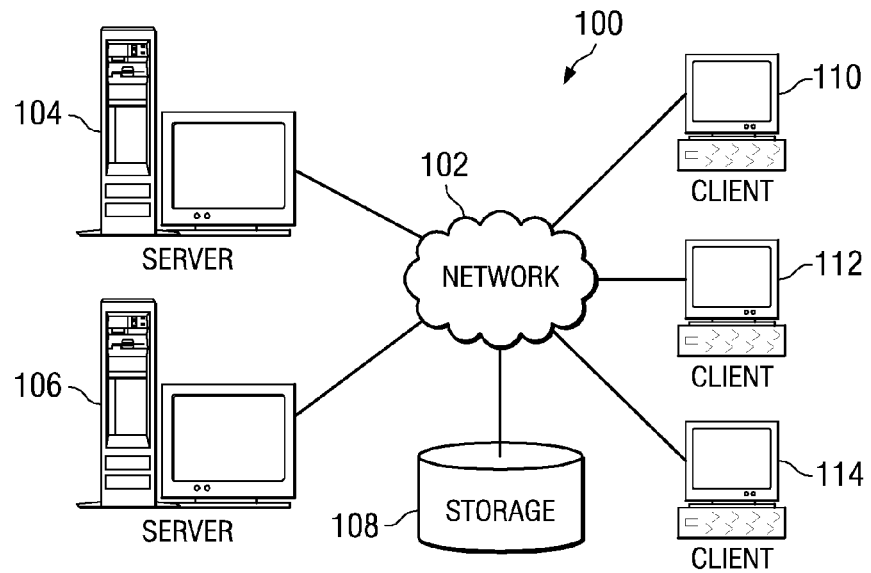
FIG. 1 is a pictorial representation of a network of data processing systems in which illustrative embodiments may be implemented.
Figure 2:
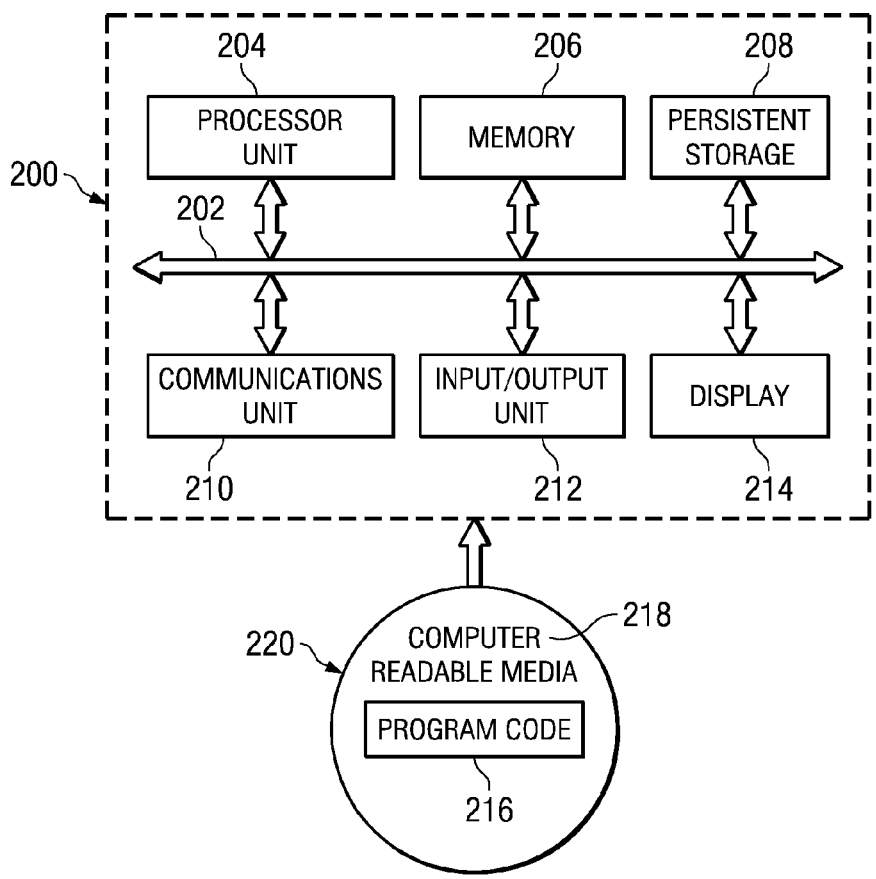
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Illustrative embodiments provide an order by proxy service in which customers, for example on clients 110-114, may place orders through a network, such as network 102, to an order by proxy service located on a server, such as server 104, for fulfillment by a set of vendors located on the same or another server, such as server 106 of FIG. 1. An order aggregation performed by the order by proxy service collects customer orders for submission to the vendors. In these illustrative examples, order aggregation is the collection of a number of separate orders, as a set of orders, according to a similar delivery date and location. The combined order, or aggregated order, is submitted as a single order to a vendor. The aggregated order also allows each order within the set of orders to be tracked individually.

Aggregated orders have a similar geographic destination or are within a reasonable proximity of that destination, as well as a similar delivery delay time, allowing customers to be grouped and their orders to be placed for bulk shipment. Aggregated orders are then released, according to predetermined criteria, for vendor processing and subsequent shipment to a designated agent, also known as a preferred agent, for further local distribution. Order release enables a collection of orders that was held or delayed, for example, for a specified time period, to be processed by a fulfillment operation in which the order is actually completed and shipped. Typically, savings in shipment costs of the aggregated order by proxy service compensate for the delay in order shipping when compared to a normal click and ship cycle order process.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
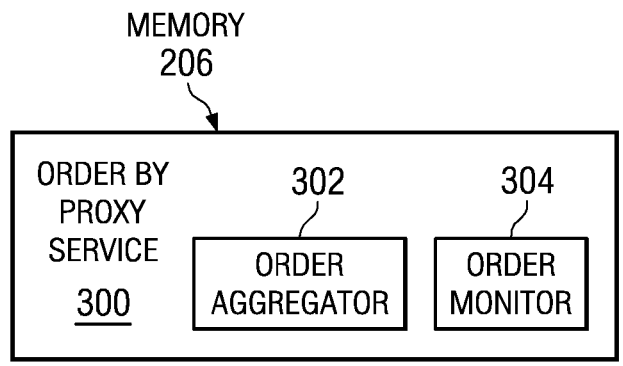
FIG. 3 is a block diagram of a portion of an order by proxy service in accordance with illustrative embodiments.

With reference to FIG. 3, a block diagram of a portion of an order by proxy service in accordance with illustrative embodiments is shown. Order by proxy service 300 may be implemented on a server, such as server 106 of FIG. 1 that is independent of any vendor or may be implemented as an integral component of a vendor system. The service location is dependent upon factors that are outside of the service. For example, one vendor may prefer to have an order by proxy service contained on a separate system independent from the vendor system, whereas in another example a vendor may chose to integrate the order by proxy service as an option of the main order entry system of that vendor. The order by proxy service works equally well in either example.

Order by proxy service 300 is shown located within memory 206 of FIG. 2. A portion of order by proxy service 300 is shown comprising order aggregator 302 and order monitor 304. Other components of order by proxy service 300 not shown include, but are not limited to, communication, initialization, and termination services as typical for a service offering.

Order aggregator 302 receives orders submitted through input processes and determines collections of orders based on customer provided input. Order aggregator 302 determines which orders should be gathered together for a unified shipment and when to place an aggregated order that has been gathered. The grouping of the orders forms the collections of orders in these examples. The input provides a set of factors including, a geographic location of the customer, proximity of the customer to a geographic location, and a delivery delay.

The geographic location is typically the location of the customer placing the order, but the geographic location also may be the location of the person that is to receive the order. The proximity of the customer to a geographic location allows for some flexibility in determining a shipping location. For example, proximity is used to establish an acceptable boundary within which a customer is willing to travel to receive an order or otherwise arrange for delivery, such as if a customer placing an order is within 50 miles of a shipment delivery point or city rather than located at the exact delivery point. In this example the boundary was established as within 50 miles of the delivery point.

A delivery delay can mean the amount of time a customer is willing to wait for an order to arrive or ship. In place of a buy now and ship now type of order and in consideration for a cost savings, a customer may defer delivery for a period of time. For example, a customer orders the item and specifies a desired ship date two weeks from now because the shipping cost is significantly less or eliminated when compared to a ship immediate scenario. Faster shipping, such as immediate, will typically cost more than delayed shipping. In some cases a delivery delay may be viewed as an order delay in which the order is held for a period of time and then released to meet a shipping date.

Order monitor 304 provides a capability for customers to track orders placed through proxy service 300. In an alternative embodiment, each customer may be provided with their respective order tracking information and access to the order information, sorted by the vendor from whom the order was placed. Although the orders have been aggregated for the purpose of shipment, these orders remain accessible to the individual or entity responsible for the specific order.

Figure 4:
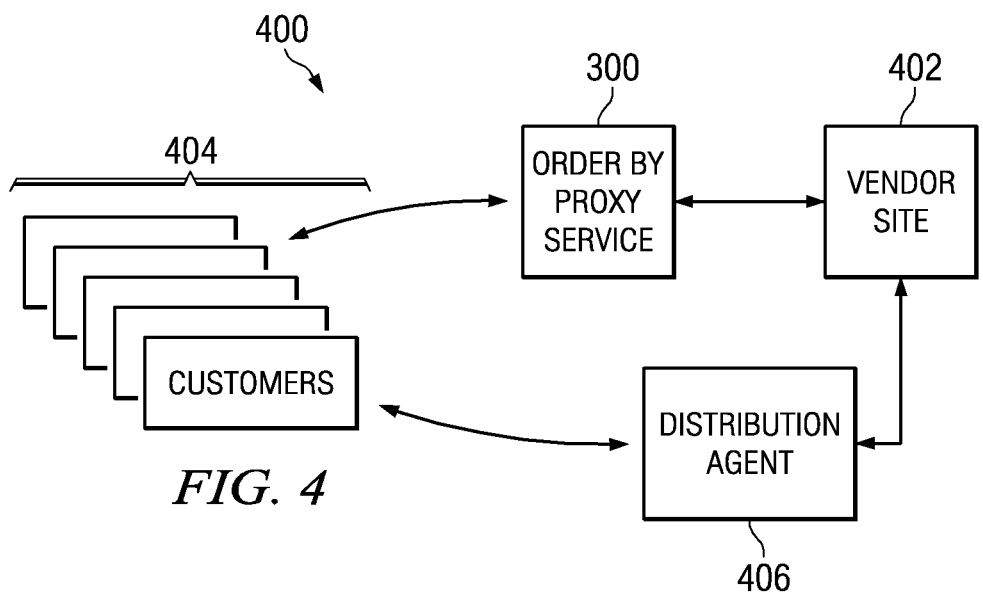
FIG. 4 is a block diagram of a system comprising an order by proxy service in accordance with illustrative embodiments.

With reference to FIG. 4, a block diagram of a system comprising an order by proxy service in accordance with illustrative embodiments is shown. A high level view of an order by proxy service system 400 is presented as may be seen in order by proxy service 300 of FIG. 3. Order by proxy system 400 typically comprises a vendor site 402, customers 404, distribution agent 406, and order by proxy service 300 component.

Order by proxy service 300 and vendor site 402 may be implemented as part of the same environment or may be entirely independent offerings on differing systems. Vendor site 402 may be a set of vendors comprising one or more vendors. Distribution agent 406 represents a point at which shipments are delivered and provides a capability for distribution to the various customers within and across order groups. For example, a drop shipment may arrive at distribution agent 406 for a set of customers 404 in which several customers belong to one or more order groups. Distribution agent 406 may be identified to be a customer having a high rating of dependability to provide distribution services to a remaining number of customers in a group. Distribution agent 406 may also be known as a preferred agent. Local distribution from the distribution agent may typically be arranged and provided for an additional fee or no fee basis. The distribution agent may also receive a reduced price of the order as a means of compensation.

Figure 5:
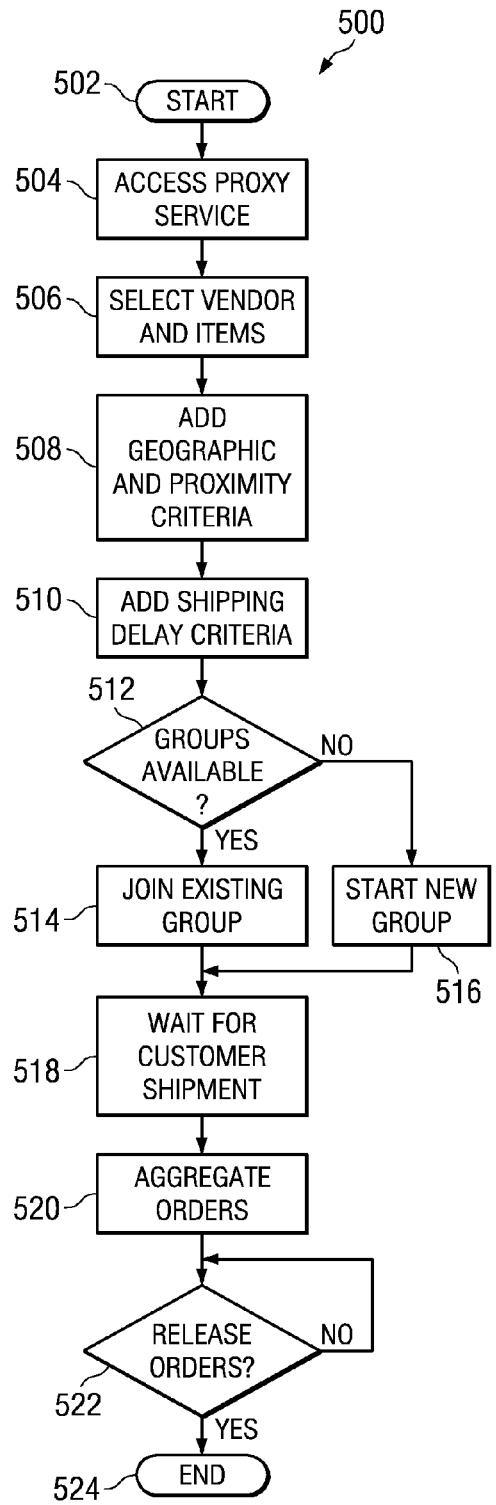
FIG. 5 is a flowchart of an order process of an order by proxy service in accordance with illustrative embodiments.

With reference to FIG. 5, a flowchart of an order process of an order by proxy service in accordance with illustrative embodiments is shown. Order process 500 is an example of an ordering process using order by proxy service 300 of FIG. 3. Order process 500 starts (step 502) and prompts customers to access the services of the proxy service (step 504). Having accessed the service, process 500 prompts customers to provide input by selecting vendors and items to obtain from the selected vendors to create an initial order (step 506). Vendor selection may or may not be required depending upon the specific implementation of the order by proxy service and the number of vendors involved. For example, if the order by proxy service is hosted by a vendor, there may be no further selection required or available.

Identifying the set of initial orders may be based on the occurrence of one of an expiration of a predetermined period of time and attaining a predetermined threshold for a number of orders received. For example, a set of initial orders may be established as all orders presented within a start and end date, or with the next ninety days or before a set date. In another example, the initial orders may be established by the number of orders received, such as in the first five hundred orders qualify.

Prompting occurs to obtain further customer input, identifying a set of delivery preferences associated with each order in a set of initial orders to form a set of identified delivery preferences. The set of delivery preferences typically comprising a geographic location, a proximity to the geographic location and a delivery or shipping delay criteria (step 508). Geographic criteria establishes the specific location where an order is to be shipped, while the proximity criteria provides a radius of acceptable distance from the specific location in which an order recipient is willing to travel or arrange for further shipment. Delivery preferences may also be stored in a customer or application preferences file or database to be used as a set of default values in the absence of a customer response. Customers may typically have access to customer preferences to avoid repetitive entry of data and to customize the process using the preferences.

The process prompts the user and requests input for shipping delay criteria in order to complete a customer order (step 510). Shipping delay criteria establishes a wait time after the initial order placement. The shipping delay criteria, such as number of units, value of units or shipping delay time, may be provided by a customer or may be provided as a set of default values for all customers. For example, a shipping delay value of the shipping delay criteria sets a time limit to be used in order grouping calculations, as well as a factor in order release timing. The time limit may typically be expressed as a number of hours, days or specified as a specific date A determination is made as to whether a suitable group exists into which a customer associated with the in-process order should be placed (step 512). If a "yes" is obtained in step 512, the customer is placed within an existing group (step 514), otherwise a "no" is obtained in step 512 and a new group containing the customer is started (step 516). Grouping may be determined on a number of factors including, for example, the location of the recipient, delivery delay, and vendor identifier. Vendors are typically identified by unique name or number. The customers, identified in the grouping of customers, then wait for their orders (step 518).

The process aggregates orders just placed (step 520). Aggregation may be based on factors including location of order recipient, delivery delay, vendor, quantity of orders, and value of orders. Although orders are aggregated for the purpose of shipping, the capability to track an individual order within the aggregated order, by a customer, is maintained. Aggregating the set of initial orders typically further comprises aggregating all orders present after a predetermined time period, for example a cutoff time specified as a date or duration of a number of days.

Aggregated orders are then reviewed to determine whether the orders are ready to be released. If the shipping delay criteria meets the conditions specified in accordance with predetermined thresholds or values, a "yes" results and the order is released as a single order for a respective group (step 522) with process 500 terminating thereafter (step 524). Orders are released based upon predetermined thresholds or values including expiration of a delivery delay duration, a quantity of orders threshold, and a value of orders threshold. For example, if a group had placed a set of orders specifying a delivery delay of five business days, then upon completion of the fifth business day, the aggregated order would be released for further processing and shipment.

If a "no" result was obtained in step 522, process 500 loops back to step 522 again to determine if the aggregated order has met predetermined thresholds or values for release.

Figure 6:
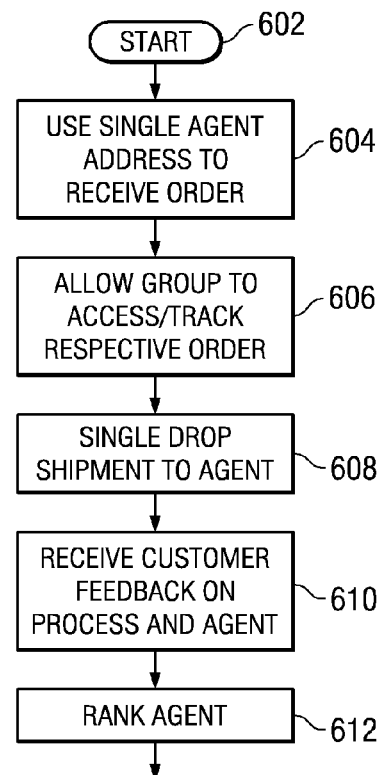
FIG. 6 is a flowchart of a shipping process of an order by proxy service in accordance with illustrative embodiments.

With reference to FIG. 6, a flowchart of a shipping process of an order by proxy service in accordance with illustrative embodiments is shown. Shipping process 600 is an example of a shipping process of order by proxy service 300 of FIG. 3. Process 600 starts (step 602) and uses a single agent address to receive the released order for a respective group (step 604). The single agent address is the location of a designated agent, also known as a preferred agent, for further local distribution. The agent was previously determined based upon a ranking by a respective group. The agent may also be a member of the group placing the order or an independent entity. Having placed the group's orders, members of the group are advised and permitted to track the progress of the shipped order (step 606).

A single drop shipment is made for the order at the location of the identified distribution agent (step 608). Customer feedback is received for the complete order by proxy process, as well as the distribution agent (step 610). The customer feedback is processed and a ranking determined for the distribution agent (step 612) with process 600 terminating thereafter (step 614). The ranking of the distribution agent is used to identify suitability of maintaining existing agents and selecting preferred agents for future use. Ranking may typically be determined based on the customer satisfaction with delivery assistance, such as promptness, courtesy, flexible hours of operation, additional shipping choices and other factors.

Thus, the illustrative embodiments provide a computer implemented method, apparatus, and computer program product for an order by proxy service to enable customers to place orders collectively. Customers are formed into a group according to common shipping delay criteria and vendor and orders for the group are aggregated into a set of orders having the common shipping delay criteria. The aggregated order is later released as a unified shipment upon meeting the shipping delay criteria to an agent address close to the location of the customers. The agent address may also represent multiple agents with respective addresses for a large dispersed shipment. In return for conforming to the shipping delay criteria a customer typically incurs less shipping costs than would have been charged for an individual order shipped direct to the customer.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method, in an order by proxy service, of managing shipments, the computer implemented method comprising:
    a processor identifying a set of initial orders received at the proxy service from a plurality of customers;
    responsive to identifying the set of initial orders at the proxy service, the processor identifying a set of delivery preferences associated with each order in the set of initial orders to form a set of identified delivery preferences;
    wherein the set of delivery preferences includes a delivery delay that is specified by the plurality of customers;
    the processor aggregating the set of initial orders based on the set of identified delivery preferences to produce an aggregated order; and
    the processor releasing the aggregated order for shipping based on predetermined criteria to create a released order, wherein the predetermined criteria includes the delivery delay, and wherein the delivery delay is a period of time between when each one of the set of initial orders is placed and the time the aggregated order is shipped, and wherein the aggregated order is not shipped until an expiration of the delivery delay.

2. The computer implemented method of claim 1, wherein the processor identifying a set of delivery preferences further comprises:
    the processor identifying a set of delivery preferences comprising a geographic location, a proximity to the geographic location that is the farthest distance each one of the plurality of customers is willing to travel to receive a delivery, a preferred agent, and wherein each one of the plurality of customers is charged a shipping fee that is lower than an original shipping fee in consideration for delaying releasing the aggregated order.

3. The computer implemented method of claim 2, wherein the preferred agent is also a customer placing an order, the preferred agent having a high rating of dependability.

4. The computer implemented method of claim 2, wherein the preferred agent receives a reduced price of the order as a means of compensation.

5. The computer implemented method of claim 1, wherein the processor aggregating the set of initial orders further comprises:
    the processor receiving a particular order from a particular one of a second plurality of customers, wherein the particular one of the second plurality of customers specifies a second delivery delay;
    the processor determining whether the particular one of the second plurality of customers can join the plurality of customers, wherein the determination is made by comparing the delivery delay with the second delivery delay;
    in response to determining that the particular one of the second plurality of customers can join the plurality of customers, the processor grouping the particular one of the second plurality of customers with the plurality of customers.

6. The computer implemented method of claim 1, wherein the processor releasing the aggregated order further comprises:
    the processor scheduling the release according to a set of release criteria comprising the delivery delay, number of items, and value of aggregated order.

7. The computer implemented method of claim 1, wherein the processor releasing the aggregated order further comprises:
    the processor prompting a customer, responsive to receiving an item in the released order, to provide feedback on a preferred agent causing the preferred agent to be ranked.

8. The computer implemented method of claim 1, wherein the processor aggregating the set of initial orders further comprises:
    the processor aggregating all orders present after a predetermined time period;
    the processor identifying the set of initial orders upon occurrence of one of an expiration of a predetermined period of time and exceeding a predetermined threshold for a number of orders received.

9. A data processing system of an order by proxy service of managing shipments, the data processing system comprising:
    a bus;
    a memory connected to the bus;
    a persistent storage connected to the bus, wherein the persistent storage comprising computer executable instructions;
    a communications unit connected to the bus;
    a display connected to the bus; and
    a processor connected to the bus, wherein the processor executes the computer executable instructions, causing the data processing system to:
    identify a set of initial orders received at the proxy service from plurality of customers;
    responsive to identifying the set of initial orders at the proxy service, identify a set of delivery preferences associated with each order in the set of initial orders to form a set of identified delivery preferences;
    wherein the set of delivery preferences includes a delivery delay that is specified by the plurality of customers;

aggregate the set of initial orders based on the set of identified delivery preferences to produce an aggregated order; and release the aggregated order for shipping based on predetermined criteria to create a released order, wherein the predetermined criteria includes the delivery delay, and wherein the delivery delay is a period of time between when each one of the set of initial orders is placed and the time the aggregated order is shipped, and wherein the aggregated order is not shipped until an expiration of the delivery delay.

10. The data processing system of claim 9, wherein the processor further executes the computer executable instructions to identify a set of delivery preferences to:

identify a set of delivery preferences comprising a geographic location, a proximity to the geographic location that is the farthest distance each one of the plurality of customers is willing to travel to receive a delivery, a preferred agent, and wherein each one of the plurality of customers is charged a shipping fee that is lower than an original shipping fee in consideration for delaying releasing the aggregated order.

11. The data processing system of claim 9, wherein the processor further executes the computer executable instructions to aggregate the set of initial orders to:

receive a particular order from a particular one of a second plurality of customers, wherein the particular one of the second plurality of customers specifies a second delivery delay;

determine whether the particular one of the second plurality of customers can join the plurality of customers, wherein the determination is made by comparing the delivery delay with the second delivery delay;

in response to determining that the particular one of the second plurality of customers can join the plurality of customers, group the particular one of the second plurality of customers with the plurality of customers.

12. The data processing system of claim 9, wherein the processor further executes the computer executable instructions to release the aggregated order for shipping further comprises:

the processor further executing the computer executable instructions to schedule the release according to a set of release criteria comprising number of items, and value of aggregated order.

13. The data processing system of claim 9, wherein the processor further executes the computer executable instructions to release the aggregated order for shipping to:

prompt a customer, responsive to receiving an item in the released order, to provide feedback on a preferred agent causing the preferred agent to be ranked.

14. The data processing system of claim 9, wherein the processor further executes the computer executable instructions to aggregate the set of initial orders to:

aggregate all orders present after a predetermined time period; and identify the set of initial orders upon occurrence of one of an expiration of a predetermined period of time and exceeding a predetermined threshold for a number of orders received.

15. A computer program product in an order by proxy service for managing shipments, the computer program product comprising a computer usable recordable medium tangibly embodying computer executable program code thereon, the computer executable program code comprising:

computer executable program code for identifying a set of initial orders received at the proxy service from a plurality of customers;

computer executable program code responsive to identifying the set of initial orders at the proxy service, for identifying a set of delivery preferences associated with each order in the set of initial orders to form a set of identified delivery preferences;

wherein the set of delivery preferences includes a delivery delay that is specified by the plurality of customers;

computer executable program code for aggregating the set of initial orders based on the set of identified delivery preferences to produce an aggregated order; and computer executable program code for releasing the aggregated order for shipping based on predetermined criteria to create a released order, wherein the predetermined criteria includes the delivery delay, and wherein the delivery delay is a period of time between when each one of the set of initial orders is placed and the time the aggregated order is shipped, and wherein the aggregated order is not shipped until an expiration of the delivery delay.

16. The computer program product of claim 15, wherein the computer executable program code for identifying a set of delivery preferences further comprises:

computer executable program code for identifying a set of delivery preferences comprising a geographic location, a proximity to the geographic location that is the farthest distance each one of the plurality of customers is willing to travel to receive a delivery, a preferred agent, and wherein each one of the plurality of customers is charged a shipping fee that is lower than an original shipping fee in consideration for delaying releasing the aggregated order.

17. The computer program product of claim 15, wherein computer executable program code for aggregating the set of initial orders further comprises:

computer executable program code for receiving a particular order from a particular one of a second plurality of customers, wherein the particular one of the second plurality of customers specifies a second delivery delay;

computer executable program code for determining whether the particular one of the second plurality of customers can join the plurality of customers, wherein the determination is made by comparing the delivery delay with the second delivery delay;

in response to determining that the particular one of the second plurality of customers can join the plurality of customers, computer executable program code for grouping the particular one of the second plurality of customers with the plurality of customers.

18. The computer program product of claim 15, wherein computer executable program code for releasing the aggregated order further comprises:

computer executable program code for scheduling the release according to a set of release criteria comprising number of items, and value of aggregated order.

19. The computer program product of claim 15, wherein computer executable program code for releasing the aggregated order for shipping further comprises:

computer executable program code for prompting a customer, responsive to receiving an item in the released order, to provide feedback on a preferred agent causing the preferred agent to be ranked.

20. The computer program product of claim 15, wherein computer executable program code for aggregating the set of initial orders further comprises:

computer executable program code for aggregating all orders present after a predetermined time period; and
computer executable program code for identifying the set of initial orders upon occurrence of one of an expiration of a predetermined period of time and exceeding a predetermined threshold for a number of orders received.

* * * * *